United States Patent
Morper

(10) Patent No.: US 6,934,273 B1
(45) Date of Patent: Aug. 23, 2005

(54) METHOD FOR TRANSMITTING PACKET-ORIENTED INFORMATION VIA A TIME-DIVISION-MULTIPLEX-ORIENTED RADIO LINK

(75) Inventor: Hans-Jochen Morper, Erdweg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,591

(22) PCT Filed: Sep. 28, 1999

(86) PCT No.: PCT/DE99/03119

§ 371 (c)(1),
(2), (4) Date: Mar. 30, 2001

(87) PCT Pub. No.: WO00/19659

PCT Pub. Date: Apr. 6, 2000

(30) Foreign Application Priority Data

Sep. 30, 1998 (DE) .................. 198 45 076

(51) Int. Cl.[7] .............................................. H04J 3/00
(52) U.S. Cl. ................ 370/337; 370/335; 370/347; 370/437
(58) Field of Search ................ 370/329–330, 370/337, 338, 347, 401, 310–314, 335, 437, 370/336, 395.4, 395.54

(56) References Cited

U.S. PATENT DOCUMENTS

| | | | |
|---|---|---|---|
| 5,416,770 A | | 5/1995 | Stoner et al. |
| 5,502,726 A | | 3/1996 | Fischer |
| 5,644,576 A | * | 7/1997 | Bauchot et al. ............. 370/437 |
| 5,673,252 A | | 9/1997 | Johnson et al. |
| 6,026,082 A | * | 2/2000 | Astrin ........................ 370/336 |
| 6,094,429 A | * | 7/2000 | Blanchette et al. ......... 370/347 |
| 6,272,121 B1 | * | 8/2001 | Smith et al. ................ 370/342 |
| 6,539,011 B1 | * | 3/2003 | Keenan et al. ............. 370/352 |

FOREIGN PATENT DOCUMENTS

| | | |
|---|---|---|
| EP | 0 654 916 A2 | 5/1995 |
| EP | 0 720 405 A2 | 7/1996 |
| WO | WO 97/32439 | 9/1997 |

* cited by examiner

*Primary Examiner*—Ricky Ngo
*Assistant Examiner*—Richard Chang
(74) *Attorney, Agent, or Firm*—Bell, Boyd & Lloyd LLC

(57) ABSTRACT

A method for transmitting packet-oriented information via a time division multiplex oriented radio link, wherein, in the downstream direction of transmission, the transmission channels are permanently allocated to all communication terminals. The packet-oriented information to be transmitted is inserted into frame-relay-oriented transmission packets, including a destination address and broadcast to all communication terminals via the permanently allocated transmission channels. The transmission packets broadcast are received by the communication terminals having the allocated destination addresses and are forwarded.

8 Claims, 1 Drawing Sheet

METHOD FOR TRANSMITTING PACKET-ORIENTED INFORMATION VIA A TIME-DIVISION-MULTIPLEX-ORIENTED RADIO LINK

1. Field of the Invention

The present invention relates to a method for transmitting packet-oriented information via a time division multiplex oriented radio link wherein, in particular, the resources of the radio link, or its transmission channels, are used in a more efficient manner.

2. Description of the Prior Art

Feeder networks of communication networks, such as public or private communication networks, are frequently connected to communication terminals with packet-oriented information transmission, for example, personal computers with an Internet function. The communication terminals are increasingly wirelessly connected, i.e. by a radio link, to the feeder network, the communication terminal being connected by wires to a terminating device implementing the radio link at the communication terminal end. At the feeder network end, the radio link is implemented by a base station which is connected in most cases to a feeder network access device by further optical or coaxial or copper transmission links. The feeder network access device which partially handles the control of the radio links is connected, for example, via an ISDN-oriented interface, such as an ISDN primary interface S20, directly or via a public or private communication network to an Internet server. Radio links in the feeder network are currently preferably implemented in accordance with a time-division multiplex access method or TDMA access (TDMA) method, respectively particularly in accordance with the standardized DECT access method, see also ETSI Standard 300 175 Part 1 to 9 in this respect.

When a connection setup is initiated by a communication terminal, a physical connection is set up to the respective Internet server in the case of an Internet connection directly or with the aid of the switching facility in accordance with the dialing information specified during the connection setup via the radio link and the feeder network. During the connection setup, a logical connection is installed between the communication terminal and Internet server. In the case of an Internet connection, this logical connection is implemented by a point-to-point protocol, called PPP in the technical world, with the aid of which the exchange of Internet packets is controlled. In this arrangement, information packets of different protocols are transported transparently with the aid of a higher-level PPP protocol. The connection set up to the Internet server remains up until the respective connection is released by the communication terminal and the connection is cleared down. Since an Internet connection frequently has phases, e.g. viewing or evaluating transmitted graphics, in which no Internet packets are transmitted, the resources, especially of the complex radio link, are inefficiently used.

An object of the present invention, therefore, consists in using the resources of the radio link, i.e. its transmission channels, more efficiently.

SUMMARY OF THE INVENTION

Accordingly, an essential aspect of the method according to the present invention can be seen in the fact that in the downstream direction of transmission, at least some of the transmission channels are permanently allocated to all communication terminals and the packet-oriented information to be transmitted for the respective communication terminals is inserted into transmission packets with the aid of a packet-oriented transmission protocol, a destination address being in each case inserted into the transmission packets for the respective communication terminals. The transmission packets are broadcast to all communication terminals via the permanently allocated transmission channels and the transmission packets broadcast are received by the communication terminals having the associated destination addresses and are forwarded. The access protocol is advantageously implemented by a frame relay transmission method.

An essential advantage of the method according to the present invention can be seen in the fact that the radio engineering resources in the downstream direction can be used to a maximum extent and no change of the time-division-multiplex-oriented access method implemented is necessary in the components implementing the radio link. Thus, an increase in efficiency of the radio engineering resources occurs with the least additional expenditure. Another advantage can be seen in the fact that a packet-oriented transmission protocol can be implemented externally, i.e. not in the components implementing the radio link, the implementation expenditure being kept low by using the simple high-performance frame relay transmission protocol.

The destination addresses can advantageously correspond directly to the communication network addresses provided for the communication terminals, or a destination address being allocated to each communication terminal and when a transmission packet is transmitted, the protocol-oriented destination address is derived from the communication-network-specific destination address and inserted into the respective transmission packets. As such, either the communication-network-specific destination address already transmitted in the connection setup or a transmission-protocol-specific destination address is derived from the communication-network-specific destination address and used for the destination-oriented transmission of the transmission packets to the respective communication terminals.

In the upstream direction of transmission, a DECT or a CDMA access method can be advantageously provided, the transmission channels (UPC) being allocated individually for each connection or via a token-oriented method TDMA-oriented method, a collision controlled method or a timetable-controlled method. In the upstream direction of transmission, an access method is of advantage in which the radio engineering resources, i.e. the transmission channels, are allocated to a connection temporarily since the allocation would give rise to considerable control complexity if the upstream radio link were to be implemented in a bus-like manner.

The number of transmission packets (tp1..tpn) which can be transmitted per unit time is advantageously variable for each connection V. Accordingly, the radio engineering resources can be used to a maximum extent depending on the available resources Ver.

According to an advantageous further development of the method according to the present invention, a logical connection is set up from the communication terminal to an Internet server and the connection V set up remains permanently. Due to this measure, an E-mail can be transmitted at any time to the communication terminal, especially a personal computer having an E-mail function. It is also possible to have a fixed charged for such a connection since the duration of the call does not need to be taken into consideration.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
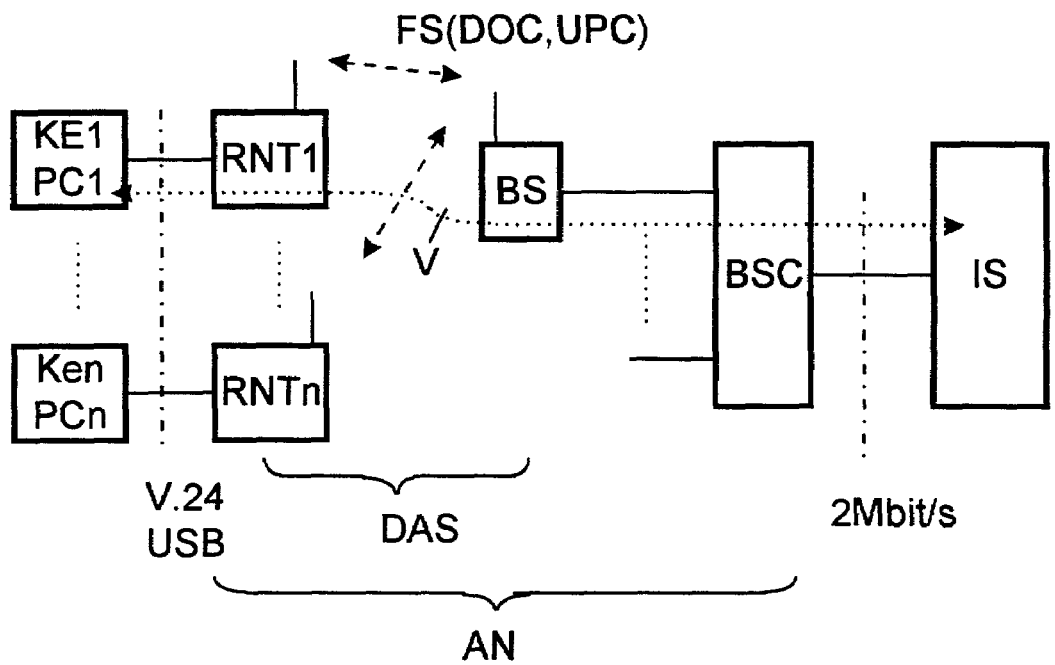
FIG. 1 shows in a block diagram a communication arrangement suitable for implementing the method according to the present invention.

FIG. 1 shows an Internet server IS to which base station controllers BSC are connected via, for example, 2-Mbit/s interfaces, a base station controller BSC is shown by way of example. The base station controller BSC is connected to a base station BS which represents the central facility of a wireless access system DAS. In the wireless access system, the base station BS is connected to terminating facilities RNT via a radio link FS, a terminating facility RNT is shown by way of example in FIG. 1. The wireless access system DAS and the base station controller BSC together form a feeder network AN. In the terminating facility RNT, a V.24 interface V.24 or, optionally, a USB interface USB is implemented to which a communication terminal KE implemented by a personal computer PC is connected. For the communication terminal KE, for example, an Internet function is provided with the aid of which Internet-oriented, packet-oriented information pi is formed and transmitted to the Internet server IS and received from the latter.

Figure 2A:
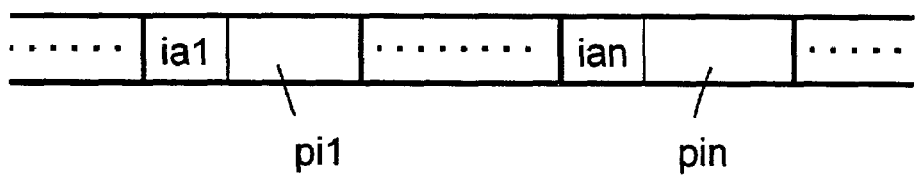
FIGS. 2a and 2b show in a block diagram the structure of the transmission packets and their insertion into time slots or, respectively, transmission channels of the DECT-oriented downlink radio link.

Packet-oriented information pi is formed in accordance with the known Internet protocol 4 or 6 also known as IP 4 or IP 6 in the technical field, i.e. the Internet packets exhibit the respective Internet addresses ia1..ian in the header. Packet-oriented information pi1..pin or Internet packets formed in this manners see also FIG. 2a, are transmitted by the Internet server IS to the base station controller BSC for the personal computers PC connected to the wireless access system DAS, and in the base station controller the packet-oriented information pi is inserted into transmission packets tp which are formed in accordance with the frame relay transmission method. A transmission packet tp according to the frame relay transmission method consists of a start bit combination, a header field, a message field, a check information item for the header field and an end bit combination, no data protection information being formed and inserted for the message information. The frame relay transmission method is used, in particular, in the transmission of packet-oriented, transaction-oriented data. As such, it can be used particularly advantageously for the transmission of packet-oriented, transaction-oriented Internet packets. Into the header of the transmission packets tp1..tpn, corresponding destination addresses za1..zan are inserted in the base station controller BSC, a destination address za1..zan being allocated to each communication terminal KE. In each case, the destination address za of the terminating facilities RNT or communication terminals (KE) to which the packet-oriented information pi contained therein is to be transmitted is inserted into the transmission packets tp1..tpn.

The radio link FS is divided into upstream and downstream transmission channels UPC, DOC. When the radio link FS is implemented in accordance with the standardized DECT access method, 12 upstream and 12 downstream transmission channels UPC, DOC are available in the case of one frequency band. In the case of a number of frequency bands, correspondingly more upstream and downstream transmission channels UPC, DOC are available. According to the present invention, all or a large proportion of the available downstream transmission channels DOC, an asymmetric distribution of upstream and downstream transmission channels can also be provided, are permanently allocated to all terminating facilities RNT or communication terminals KE for transmitting information. As such, for example, a transmission capacity of 12×32 kbit/s is available in the case of one DECT frequency band. During a connection setup initiated by the communication terminal KE, a virtual connection V is set up from the communication terminal KE via the radio link FS to the base station controller BSC. During the connection setup, a connection is also set up to the Internet server IS and both connections can remain permanently. As an alternative, in the case of an implementation of the frame relay transmission method up to the Internet server IS, the logical connection V can be set up to the Internet server IS and remain permanently. This provides the advantage that packet-oriented information pi—especially E-mail information—can be transmitted at any desired time, especially in the downstream direction of transmission.

Figure 2B:
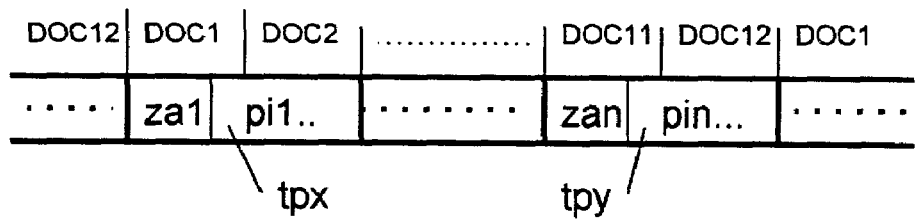

The transmission packets tp1..tpn formed, including the inserted destination addresses za1..zan, are transmitted to all terminating facilities RNT via the downstream transmission channels DOC. Transmission packets tpx, tpy formed are transmitted, for example, at a transmission rate of 64 kbit/s in "free double-slot channels" of the downstream transmission channels DOC1..DOC12, see also FIG. 2b. In the terminating facilities RNT, the transmitted transmission packets tp1..tpn are received, and the destination address tp1..tpn inserted into the header is investigated, in all allocated downstream transmission channels DOC1..DOC12. If the inserted destination occurs za1..zan corresponds to the destination address za1..zan allocated to the respective terminating facility RNT or to the communication terminal KE, the associated transmission packet tp1..tpn is received in the relevant terminating facility RNT and forwarded to the personal computer PC.

In the upstream transmission channels UPC, which is not shown in detail, arbitrary access methods can be used for the access by the terminating facilities RNT to the radio engineering resources of the upstream direction of transmission. Possible access methods are the DECT access method already specified or the CDMA method. Furthermore, the token access methods or access methods with collusion detection or time-table-controlled methods, provided for accessing local area networks, can be used or provided.

The use of the method according to the present invention is not restricted to the exemplary embodiment and can be used in other feeder network configurations including a number of radio links FS or a number of feeder network components; only the destination addresses za need to be converted or adapted in the case of different access and switching methods.

Although the present invention has been described with reference to specific embodiments, those of skill in the art will recognize that changes may be made thereto without departing from the spirit and scope of the invention as set forth in the hereafter appended claims.

What is claimed is:

1. A method for transmitting packet-oriented information between a central facility and communication terminals via a feeder network, at least one radio link including transmission channels implemented in accordance with a TDMA access method being arranged in a communication terminal area in the feeder network, the method comprising the steps of:
   permanently allocating, in a downstream direction of transmission, at least some of the transmission channels to all communication terminals;
   inserting the packet-oriented information to be transmitted for the respective communication terminals into transmission packets using a packet-oriented transmission protocol;
   inserting a respective destination address into the transmission packets for the respective communication terminals;
   broadcasting the transmission packets to all the communication terminals via the permanently allocated transmission channels; and
   receiving the transmission packets, via the downstream direction of transmission, by the terminating facilities associated with the communication terminals having the associated destination addresses, and then forwarding the transmission packets to the communication terminals.

2. A method for transmitting packet-oriented information between a central facility and communication terminals via a feeder network as claimed in claim 1, wherein the transmission protocol is implemented via a frame relay transmission method.

3. A method for transmitting packet-oriented information between a central facility and communication terminals via a feeder network as claimed in claim 1, wherein the destination addresses correspond to the communication network addresses provided for the communication terminals.

4. A method for transmitting packet-oriented information between a central facility and communication terminals via a feeder network as claimed in claim 1, wherein a protocol-oriented destination address is allocated to each communication terminal, the protocol-oriented destination addresses being derived from the communication-network-specific destination addresses and being inserted into the respective transmission packets.

5. A method for transmitting packet-oriented information between a central facility and communication terminals via a feeder network as claimed in claim 1, wherein, in an upstream direction of transmission, one of a DECT and a CDMA access method is provided, the transmission channels being allocated one of individually for each connection, by a token-oriented method, by a TDMA-oriented method, by a collision-controlled method, and a time-table-controlled method.

6. A method for transmitting packet-oriented information between a central facility and communication terminals via a feeder network as claimed in claim 1, wherein a sum of the transmission packets broadcast over at least some of the downstream transmission channels per unit time is equal to a sum of all transmission packets transmitted over a frame relay transmission path per unit time.

7. A method for transmitting packet-oriented information between a central facility and communication terminals via a feeder network as claimed in claim 1, wherein a logical connection is permanently set up from the communication terminal to the central facility.

8. A method for transmitting packet-oriented information between a central facility and communication terminals via a feeder network as claimed in claim 7, wherein a number of transmission packets which can be transmitted per unit time is variable for each logical connection.

* * * * *